(12) United States Patent
Sahouani et al.

(10) Patent No.: US 6,245,399 B1
(45) Date of Patent: Jun. 12, 2001

(54) GUEST-HOST POLARIZERS

(75) Inventors: Hassan Sahouani, Hastings; Kim M. Vogel, Lake Elmo, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/172,440

(22) Filed: Oct. 14, 1998

(51) Int. Cl.$^7$ .............................. C09K 19/60; F21V 9/14; G02B 5/30
(52) U.S. Cl. ................ 428/1.31; 252/299.1; 252/585; 349/194; 359/483; 264/1.34
(58) Field of Search ................ 428/1.1, 426, 1.3, 428/1.31; 252/299.1, 582, 585; 349/75, 117, 194; 359/483; 264/1.34

(56) References Cited

U.S. PATENT DOCUMENTS

| | | | |
|---|---|---|---|
| 2,400,877 | 5/1946 | Dreyer | 359/491 |
| 2,524,286 | 10/1950 | Dreyer | 359/491 |
| 2,544,659 | 3/1951 | Dreyer | 359/491 |
| 4,030,812 | * 6/1977 | Strebel | 428/1 |
| 4,031,092 | 6/1977 | Strebel | 544/198 |
| 4,309,182 | 1/1982 | Koll et al. | 8/527 |
| 5,024,850 | 6/1991 | Broer et al. | 428/1.1 |
| 5,639,809 | 6/1997 | Matsuzaki et al. | 524/159 |
| 5,700,296 | 12/1997 | Ogino et al. | 8/489 |
| 5,739,296 | 4/1998 | Gven et al. | 534/577 |
| 5,948,487 | * 9/1999 | Sahouani et al. | 428/1 |
| 5,953,089 | * 9/1999 | Hiji et al. | 349/112 |
| 6,049,428 | * 4/2000 | Khan et al. | 359/491 |

FOREIGN PATENT DOCUMENTS

| | | |
|---|---|---|
| 3033141 | 2/1983 | (DE) . |
| 53-126951 | 4/1977 | (JP) . |
| 56-64301 | 6/1981 | (JP) . |
| 62-69202 | * 3/1987 | (JP) . |
| 3-294802 | 12/1991 | (JP) . |
| 56-51701 | 5/1993 | (JP) . |
| 6-265727 | 9/1994 | (JP) . |
| 10-333154 | * 12/1998 | (JP) . |
| WO 94/28073 | 12/1994 | (WO) . |
| WO 95/17303 | 6/1995 | (WO) . |
| WO 96/19347 | 6/1996 | (WO) . |
| WO 97/39380 | 10/1997 | (WO) . |

OTHER PUBLICATIONS

George H. He8ilmeier et al., "Guest–Host Interactions in Nematic Liquid Crystals", *Molecular Crystals and Liquid Crystals*, vol. 8, pp. 293–304, 1969.

D.B. Bostwock et al., "Polarized Absorption Spectroscopy as a Tool in Studying Guest–Host Interactions in a Nematic Lyotropic Liquid Crystal", *Mol. Cryst. Liq. Cryst.*, vol. 147, pp. 179–186, 1987.

Neville Boden et al., "Lyotropic Mesomorphism of the Cesium Pentadecafluorooctanoate/Water Sytem: High–Resolution Phase Diagram", *J. Phys. Chem.*, 91, pp. 4092–4105, 1987.

Monique Boidart et al., "An Actualized Survey of Micellar Nematic Lyophases", *Mol. Cryst. Liq. Cryst.*, vol. 154, pp. 61–67, 1988.

M.C. Holmes, "Characterization of Lyotropic Nematics by Microscopy", *Mol. Cryst. Liq. Cryst.*, vol. 100, pp. 93–102, 1983.

B. Luhmann et al., "A lyotropic nematic phase of lamellar micelles ($N_L$), obtained by a non–ionic surfactant in aqueous solution", *Colloid & polymer Sci.*, 264:189–192 (1986).

T.K. Attwood et al., "The chromonic phases of dyes", *Liquid Crystals*, vol. 1, No. 6, pp. 449–507, 1986.

* cited by examiner

Primary Examiner—Shean C. Wu
(74) Attorney, Agent, or Firm—William D. Miller

(57) ABSTRACT

A polarizer is described that is formed of a host matrix and a guest dye. The host matrix may be a lyotropic liquid crystal matrix having a predetermined orientation. A guest pleochroic dye may be disposed within the host lyotropic liquid crystal matrix. The guest pleochroic dye is oriented by the orientation of the host matrix.

28 Claims, 9 Drawing Sheets

GUEST-HOST POLARIZERS

TECHNICAL FIELD

The present invention relates to dichroic polarizers wherein pleochroic dye molecules are held in predetermined orientations in a molecular matrix. In another aspect, the invention involves dichroic polarizing materials that utilize guest-host effects between liquid crystal materials and pleochroic dyes.

BACKGROUND

Dichroic materials are useful for preferentially transmitting light polarized in one direction. When a layer of dichroic material is placed in the path of a beam of randomly polarized light and the component of transmitted light polarized in one plane is of low or negligible intensity compared to the intensity of light polarized in the orthogonal plane, the transmitted light is said to be linearly polarized, and the layer of dichroic material is referred to as a linear dichroic polarizer. Dichroic polarizers may transmit light of a particular polarization over a relatively wide spectrum, such as the visible spectrum, or they may transmit light of particular polarizations in more limited ranges of wavelengths.

One class of material suitable for producing dichroic effects is the class known as pleochroic dyes. A pleochroic dye molecule is a molecule having a light absorption spectrum that varies as a function of the orientation of the molecule with respect to the polarization of incident light. Dichroic polarizers can be made by forming a layer of oriented pleochroic dye molecules on a substrate. Pleochroic dye molecules which are self-orienting when applied to a suitable substrate are known, as are pleochroic dye molecules which require the application of some other orienting means, such as blending with or otherwise combining with a second material in order to produce suitable orientation.

Pleochroic molecules can be oriented by applying them to a surface which has been unidirectionally rubbed by a mildly abrasive material, thereby producing a dichroic polarizing layer, as disclosed by Dreyer in U.S. Pat. No. 2,400,877. Dreyer further discloses that a flexible polymeric film that has been suitably stretched can also produce surface orientation capable of orienting pleochroic molecules. Japanese published patent application 53-126951 discloses rubbing a glass surface with a paper or cloth impregnated with a pleochroic dye, thereby combining the surface preparation step with the coating step. An alternative method of surface preparation is disclosed in Japanese published patent application 3-294802, wherein grooves or trenches are formed by exposing a layer of photoresist to a holographically generated line pattern, developing the photoresist, rinsing, and applying iodine or a dichroic dye to the resulting structured layer. Surface orientation processes suffer the disadvantage of requiring additional, sometimes difficult processing steps, which can be especially troublesome in a manufacturing setting. Moreover, not all materials that might be useful as substrates for dichroic layers are necessarily amenable to the particular type of surface orientation that a particular dichroic layer might require.

Substrates capable of orienting certain dyes can also be produced by stretching a polymer, such as polyvinyl alcohol, followed by dying of the polymer, as disclosed in published Japanese patent application 62-65727. As disclosed in U.S. Pat. No. 5,639,809, materials having polarizing properties can also be produced by dying a film of polyvinyl alcohol before stretching, rather than after, and then stretching the dyed film to orient the dye.

Dichroic polarizers formed by combining a dichroic dye with a monomer, coating the mixture onto a substrate, and curing by means of radiation are disclosed in U.S. Pat. No. 5,024,850. As disclosed in published Japanese application 56-064301, the dichroic dye itself can also be a polymer. As disclosed in published Japanese application 56-051701, some commonly known pleochroic dyes can be combined with suitable polymers, such as those containing tertiary or quaternary nitrogen atoms, to form, after stretching, a polarizing film. The need for stretching the substrate, either before or after application of the dye-containing layer, limits the application of such polarizing layers to those substrates which can be stretched, and which undergo the desired surface orientation as a result of stretching. Glass, for example, is a very useful substrate for many optical applications, due to its dimensional stability and durability, but glass is not readily orientable by stretching. Moreover, stretching of the substrate in a suitably controlled manner requires considerable investment in equipment and expenditure of operating resources.

Dyes are known which form ordered structures having dichroic properties without combining with other materials. Dyes which are capable of forming stable liquid crystalline phases induced by shear effects during the coating process are disclosed in published PCT application WO 94/28073, wherein sufficient ordering is produced during coating and retained during drying to produce a layer having polarizing properties. Dichroic layers formed in this manner suffer from the disadvantage that only a limited class of dye compounds are capable of ordering themselves in this manner, whereas there are a great many other pleochroic dyes which have useful color and other properties which would be useful if ways could be found to hold them in suitable orientations.

Dye molecules which absorb light at suitable wavelengths, but do not, by themselves, form ordered or polarizing layers, can, in some instances, cooperate with liquid crystalline compounds to form dichroic materials. This effect has been used to produce liquid crystal displays, as discussed, for example, by Heilmeier et al, "Guest-Host Interactions in Nematic Liquid Crystals", MOLECULAR CRYSTALS AND LIQUID CRYSTALS, (1969), Vol. 8, pp. 293–304. Guest-host phenomena in aqueous solutions of disodium cromoglycate, which forms nematic ordered structures in aqueous solution, were studied by Bostwick et al, "Polarized Absorption Spectroscopy as a Tool in Studying Guest-Host Interactions in a Nematic Lyotropic Liquid Crystal", MOLECULAR CRYSTALS AND LIQUID CRYSTALS, Vol. 147, June, 1987, pp. 179–186. The disclosed guest-host materials suffer, however, from being liquids, which is a disadvantage in applications where a solid polarizing layer is desired.

SUMMARY OF THE INVENTION

The present invention provides dichroic layers comprising molecular matrices that hold pleochroic dye molecules in predetermined orientations so as to produce polarization of incident light. In a preferred embodiment, dichroic layers are formed by coating an aqueous solution of one or more pleochroic guest dyes and a lyotropic liquid crystal host material onto a solid substrate. The present invention provides significant improvement for polarizers used in a liquid crystal display (LCD), especially those having a large screen size. In particular, it has been found that many of the limitations on the image quality encountered in such devices can be traced to the limited dimensional stability of the polarizers used. The present invention provides polarizers that are formed by a relatively simple coating operation using a wide choice of substrates, with glass being a highly preferred substrate, due to its dimensional stability.

In a preferred embodiment, lyotropic nematic liquid crystalline materials are used as the molecular matrix. It has been found that liquid crystalline materials containing at least one triazine group are especially useful, and that materials in this class can act as hosts to a variety of guest dyes, from the class of acid, basic, direct and reactive dyes. Dichroic polarizing layers can be formed by coating an aqueous solution of a lyotropic liquid crystalline host compound containing at least one triazine unit per molecule along with one or more guest dye compounds onto a solid substrate and drying the coating. It has been found that sufficient shear can be applied to the aqueous layer during coating to impart an ordered structure to the liquid crystalline host material, and that this ordered structure then imposes sufficient order on the pleochroic guest dye to produce an oriented coated layer which has, after drying, dichroic polarizing properties. Because the levels of shear stress created in the liquid layer during coating are low compared to the shear stresses which might cause mechanical deformation of the substrate, the process of forming the dichroic layer has a reduced tendency to create stresses in the substrate which might disrupt its optical properties. The guest dyes can be used either singly, to produce dichroic effects over a limited range of wavelengths, or in combination, to produce dichroic effects over a wider range, as might be useful, for example, in producing a neutral density polarizer. Dyes that have been found particularly suitable as guest dyes are those dyes containing at least one triazine group. Guest-host layers which exhibit a dichroic effect only at particular, relatively narrow, ranges of wavelengths can be especially useful as correcting or cleanup polarizers for other, nondichroic, polarizers, such as reflecting polarizers, which sometimes suffer reduced effectiveness due to light leakage at particular wavelengths. The dichroic polarizers of the present invention exhibit surprisingly improved heat resistance, especially when applied to a glass substrate. Heat resistance can be important in liquid crystal displays requiring high levels of illumination, since some of the light used for illumination will inevitably be absorbed by the components of the display.

BRIEF DESCRIPTION OF THE DRAWINGS

The invention may be more completely understood in consideration of the following detailed description of various embodiments of the invention in connection with the accompanying drawings, in which.

DETAILED DESCRIPTION OF THE INVENTION

Figure 1A:
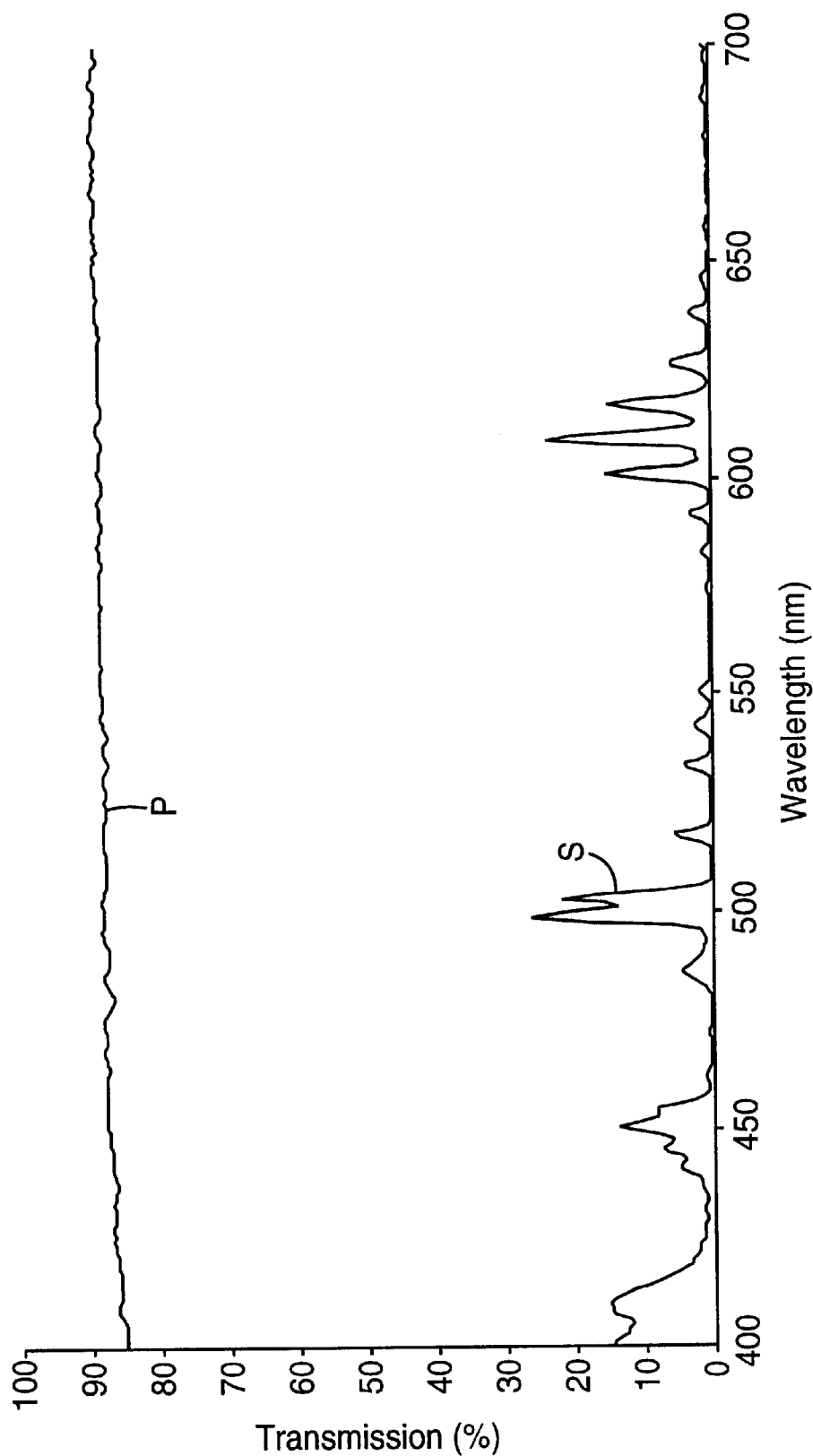
FIGS. 1A–1C illustrate transmission spectra of polarizers in accordance with an embodiment of the invention.

The dichroic layers of the present invention comprise a host material and a guest pleochroic dye material, wherein the guest-host layer is preferably carried on a dimensionally and thermally stable substrate. It is further preferred that the guest-host layer be applied to the substrate in a manner which subjects the substrate to relatively little mechanical or thermal stress, so as not to create stress-induced optical effects in the guest-host layer or in the substrate. A preferred method for applying the guest host layer to the substrate is to apply it as a liquid coating solution which can be oriented during coating and dried to a solid layer which retains the orientation of the pleochroic guest dye material. Orientation of the liquid layer during coating can be achieved, for some coating materials, by use of a coating method that produces a shear field in the coated liquid layer. Many coating methods, such as knife coating, Mayer rod coatings, and certain types of roll or gravure coating, are known to produce this effect when used with suitable coating materials. One general class of coating materials that are orientable in this manner is the lyotropic liquid crystal materials, especially those that form nematic structures. It is preferred that the guest materials, particularly pleochroic dyes, be incorporated into the coating solution which contains the host material, so that orientation of the coated liquid layer by the shear field produced during coating also orients the guest dye incorporated therein.

In a preferred embodiment, the dichroic layers of the present invention comprise lyotropic liquid crystalline host compounds containing at least one triazine group per molecule and pleochroic guest dye compounds which can be oriented by the host compound. A number of pleochroic dyes are suitable for use in connection with the present invention, provided that the dyes (a) do not disrupt the orientation of the host compound, (b) are orientable by the host compound, (c) are compatible with the coating solution, and (d) provide the desired optical effect. Suitable dyes can be selected from classes of acid, basic, direct and reactive dyes. It is preferred that the host compounds and the guest dyes both be soluble in aqueous solution, and that solidification of the layer occur by drying of the aqueous solution. One class of host compounds suitable for the present invention includes those having the structure:

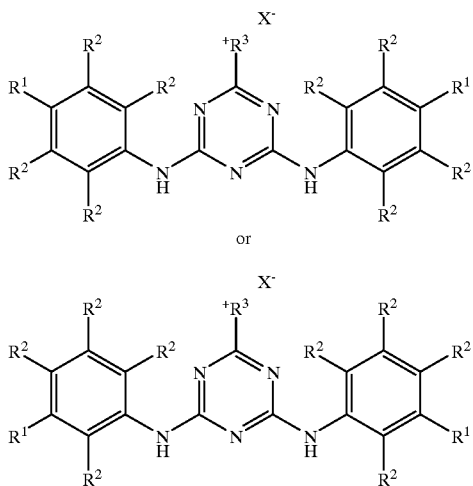

In formula I above, $R^1$, which may be the same or different, is a hydrophilic group. For example, $R^1$ may be selected from carboxyl (COOH), sulfonic ($SO_3H$), sulfinic ($SO_2H$), phosphonamide $PO(NH_2)_2$, sulfonamide ($SO_2$ $NH_2$), or phosphate ($PO(OH)_2$) groups. $R^1$ preferably a carboxyl group or a sulfonic group, and is most preferably a carboxyl group. The most preferred location for $R^1$ is para with respect to the amino linkage to the triazine backbone of the compound.

For this class of host compounds, the $R^2$ groups, which can be the same or different, may be selected from any electron donating group, electron withdrawing group, or electron neutral group. Preferably, $R^2$ is hydrogen or a substituted or unsubstituted alkyl group, and most preferably $R^2$ is hydrogen.

In formula I, $R^3$ may be selected from substituted or unsubstituted, positively charged heteroatomic rings derived from pyridine, pyridiazine, pyrimidine, pyrazine, imidazole, oxazole, thiazole, oxadiazole, thiadiazole, pyrazole, triazole, triazine, quinoline, and isoquinoline. Suitable substituents for $R^3$ include substituted amino, pyrrolidino, and piperidino groups. It is useful, in some instances, for $R^3$ to be substituted with electron donating groups, for purposes of improving or removing the color of the compound. Preferably $R^3$ is a substituted pyridine ring, and most preferably $R^3$ is 4-dimethylaminopyridine.

The counterion $X^-$ may vary widely, depending on the solvent selected and on the intended application. The preferred counterion $X^-$ is bisulfate, but other counterions are also possible including, but not limited to $CH_3COO^-$, $CF_3COO^-$, $BF_4^-$, $PF_6^-$, $SbF_6^-$, $CH_3SO_3^-$, $CF_3SO_3^-$, $PhCO_2^-$, $Cl^-$, and $OH^-$.

This class of host compounds may be prepared as aqueous solutions, or may be prepared as salts that can later be re-dissolved to form an aqueous solution. The compounds in this class are typically soluble in basic aqueous solutions having a suitably adjusted pH. While $NH_4OH$ was found to be a suitable base for adjusting the pH to an appropriate level, the invention is not limited to this base, and other suitable bases, such as cesium hydroxide, may also be used.

Various methods of preparation of host compounds particularly suited for use in the present invention are disclosed in U.S. Pat. No. 5,948,487, also assigned to the present applicant and incorporated herein by reference.

Guest-host coating solutions comprising the host and guest compounds disclosed hereinabove can be prepared by first preparing an aqueous solution comprising water and a pH adjusting compound such as $NH_4OH$. The coating solution is then prepared by dissolving the host compound and the guest compound, along with other additives, such as a surfactant to improve coatability, in the aqueous solution. The host compound can typically be added in amounts sufficient to form a lyotropic solution having a host compound concentration of about 8% to 20% by weight of solution, though concentrations in the range of about 10% to 16% are often preferable. Host solution concentrations outside of this range may be used, provided, on the one hand, that the resulting solution provides sufficient ordering of the guest-host structure after coating, and provided the resulting coating solution is sufficiently concentrated to provide adequate coating thickness and dryability, but not so concentrated, on the other hand, as to be prohibitively difficult to coat and orient after coating.

If it is desired to polarize light in only a selected range of wavelengths, a single dye may be used in the guest-host solution. If it is desired to provide a neutral density polarizer, that is to say a polarizer that polarizes light in a substantially equal manner over the visible spectrum, several guest dyes of different colors can be added to the host solution. Polarizers which are of substantially neutral density can, for example, be produced by adding a cyan dye, a magenta dye, and a yellow dye, to the host solution, or, alternatively, by adding a violet and a yellow dye to the host solution. It has been found that higher levels of dye purity are desirable, since impurities such as salts and organic nonionic materials found in some commercially available dyes tend to attenuate all visible light, regardless of polarization, thereby reducing the efficiency of polarization and giving the filter a dark color. In particular, it is desirable that the level of impurities in the dyes be in the range of 1% or lower, based upon the weight of the dye present. The number of guest dye molecules present in the guest-host solution may approach the number of host molecules, but it is preferred that there be somewhat fewer guest dye molecules than host molecules, so that the ratio of guest molecules to host molecules is preferably in the range of 0.6 to 0.8. In general it is desirable to make the overall dye concentration in the solution less than about 50% by weight. In certain instances it may be desirable to have a concentration that is less than about 20% and in other circumstances it is desirable to have the concentration less that about 10%. For many polarizer applications it is desirable to have a concentration ranging from about 5% to 10% by weight.

Coating of the guest-host solution onto solid substrates can be performed by any convenient means, though coating methods which impart some shear stress to the coated layer during coating are preferred. Shear stress imparted to the coated layer during coating serves to urge molecular ordering of the guest and host molecules.

Drying of the coated layer can be performed by any means suitable for drying aqueous coatings which does not damage the coating or significantly disrupt any molecular ordering of the coated layer which may have been produced by shear stress or other ordering effects applied during coating. A layer consisting of a polymeric layer containing a metal salt (e.g., a water soluble polymer containing zinc chloride, or other divalent cations) can be applied to the dried coating to improve its transmission and protect it against mechanical damage. Other polymer matrices can be used as carriers for the divalent cations.

EXAMPLE 1

When R1 is a —COOH group, R2 is hydrogen, R3 is a pyridinium group, and X⁻ is a sulfate group, the resulting compound is 1-[4,6-di(4-carboxyanilino)-1,3,5-triazin-2-yl] pyridinium hydrogen sulfate, which was prepared in the following manner, according to the reaction shown.

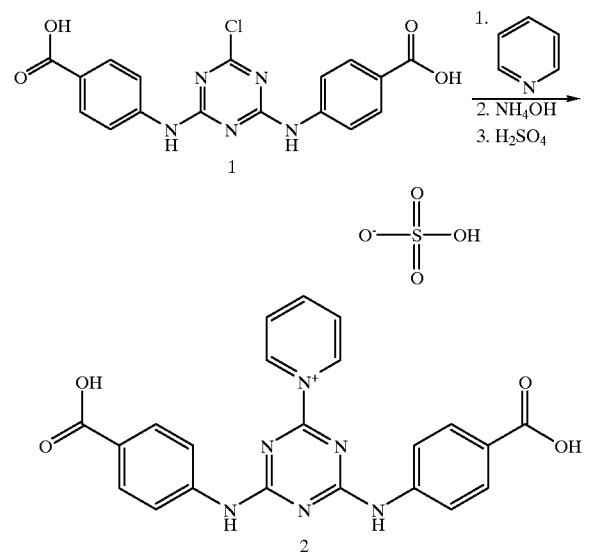

A mixture of 117 mLs of pyridine and 39 grams 4,4'-[(6-chloro-1,3,5-triazine-2,4-diyl)diimino]bis-benzoic acid (1, Preparation of this compound is described in Example 3) was heated slowly to 85° C. and held at this temperature for one hour. The mixture was cooled to 15° C. and the solid was collected, washed with pyridine, and dried to give 47.69 grams of a yellow solid. A 4.44 gram sample of the solid was dissolved in 115 ml of water containing 1.62 ml of 30% aqueous ammonium hydroxide solution. A dilute aqueous solution of sulfuric acid (4% by weight) was added slowly dropwise until the pH reached 3.5. The solid was collected, washed with water and acetone and dried. NMR analysis showed a structure consistent with 1-[4,6-di(4-carboxyanilino)-1,3,5-triazin-2-yl]pyridinium hydrogen sulfate (2), which will hereinafter be called compound A.

EXAMPLE 2

A host solution of compound A was prepared by dissolving 10 g of compound A in 100 g of a 0.5 to 2.0% aqueous solution of $NH_4OH$. To this solution was then added 0.1% by weight of a surfactant available from Rohm & Haas, Philadelphia, Pa. under the Trade Name Triton x-100, to enhance its coatability on polymeric substrates.

EXAMPLE 3

In formula I, when $R^3$ is pyridinium, the substituent for $R^3$ is 4-dimethylamino, and X⁻ is bisulfate, the resulting compound is 1-[4,6-di(4-carboxyanilino)-1,3,5-triazin-2-yl]-4-(dimethylamino)pyridinium hydrogen sulfate, which was prepared by the following reaction and procedure.

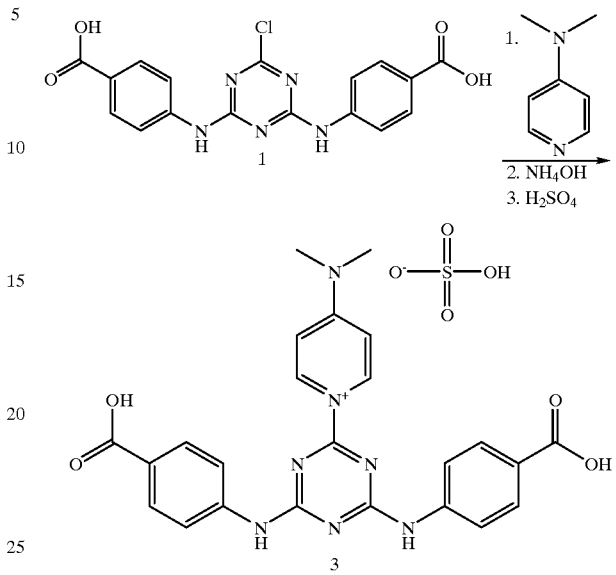

To 350 grams of 4-aminobenzoic acid and 7437.5 grams of water at 11° C. was added a solution of 157.1 grams of cyanuric chloride in 739.93 grams of acetone and a solution of 135.2 grams of sodium carbonate in 993.5 grams of water simultaneously dropwise at a rate such that the temperature was maintained below 15° C. Following the addition the batch was allowed to mix for one hour at 15° C. and then warmed to room temperature. The solid was collected, washed with water and acetone and dried to give 335 grams of 4,4'-[(6-chloro-1,3,5-triazine-2,4-diyl)diimino]bis-benzoic acid (1) as a white/tan solid.

A mixture of 325 grams of 4,4'-[(6-chloro-1,3,5-triazine-2,4-diyl)diimino]bis-benzoic acid, 102.92 grams of 4-dimethylaminopyridine, and 3220.4 grams of dimethylsulfoxide was heated to 90° C. for five hours. The mixture was cooled to room temperature and 1185 grams of acetone was added. The solid was collected and washed with acetone. The solid was dissolved in a solution of 2000 grams of water and 404 grams of 30% aqueous ammonium hydroxide. A premix was prepared by dissolving 310 grams of concentrated sulfuric acid in 3100 grams of water. This premix was added slowly to the reaction mixture until a pH was 3.3 was obtained. The solid was collected, washed extensively with water, and dried to give 220 grams of 1-[4,6-di(di (4-carboxyanilino)-1,3,5-triazin-2-yl] pyridinium hydrogen sulfate (3), which will hereinafter be called compound B.

EXAMPLE 4

A host solution was prepared by dissolving 10 g of compound B in 100 g of 2% aqueous solution of $NH_4OH$ containing about 0.1% by weight of a surfactant available from Rohm & Haas, Philadelphia, Pa. under the Trade Name Triton x-100, to enhance its coatability on polymeric substrates.

EXAMPLE 5

A gray guest-host solution was prepared by dissolving simultaneously 1.5 grams of compound B, 0.6 grams ammonia hydroxide, 0.3 grams of Crompton and Knowles Intrajet Blue JE (a direct dye), 0.3 grams of Kayaku yellow P-N3R (a reactive dye), 0.3 grams Keystone red 6B (a reactive dye), 7 grams water, and 0.1 grams of a 10% solution of Tritom x-100. Small amounts, generally less than 5% by weight of solution of some water soluble polymer such as polyethylene glycol or other polymer, can be added to the solution of Example 5 to give the coating some structural strength.

EXAMPLE 6

A neutral density polarizer was prepared by coating a 12 micron wet layer of the gray guest-host solution of Example 5 onto a suitable substrate and then drying the coating using a jet of air. The dried thickness of the resulting coating was about 2–3 microns. A polymeric layer containing a water soluble polymer, such as sulfonated polystyrene, dextran sulfate, or any other suitable polymer in the concentration of 20 to 50% and a metal salt such as $CdCl_2$, $CdI_2$, $2NCl_2$ or $ZnCl_2$ in the concentration of 10 to 30% was then coated on top of the dried coating to provide improved transmission and protection against mechanical damage. The polarizer obtained shows transmission of p-polarized light in the range of about 80% and extinction less than about 3%.

EXAMPLE 7

The guest-host polarizers of the present invention can be used to correct some commonly occurring deficiencies of reflective polarizers. Referring to FIG. 1a, spectral trace P shows the transmission of a multilayer optical film reflective polarizer of the type disclosed in PCT published patent applications WO95/17303 and WO96/19347 (incorporated herein by reference) in the visible wavelength range, for light polarized in the plane of transmission of the polarizer. Spectral trace S shows the transmission of light polarized in a plane perpendicular to the plane of transmission of the reflecting polarizer over the same spectral range. It is desirable, in most polarization applications, that trace P be, as nearly as possible, a flat line at 100% transmission, and that trace S be, as nearly as possible, a flat line at 0% transmission. It will be observed in FIG. 1a that trace S deviates significantly from a 0% transmission line at several wavelengths, particularly around 500 nm (nanometers) and between 600 and about 625 nm (nanometers). These deviations represent light leaks, which appear as reduced purity of polarization of the transmitted light, and may also cause color aberrations in situations wherein light of a particular polarization is to be blocked, as can occur, for example, in certain types of liquid crystal displays. Additionally, since the leaked light is light which ought to have been reflected, the reflected light may also be of a slightly different color, even though no detrimental effect on purity of polarization is likely to be seen for the reflected light.

Figure 1B:
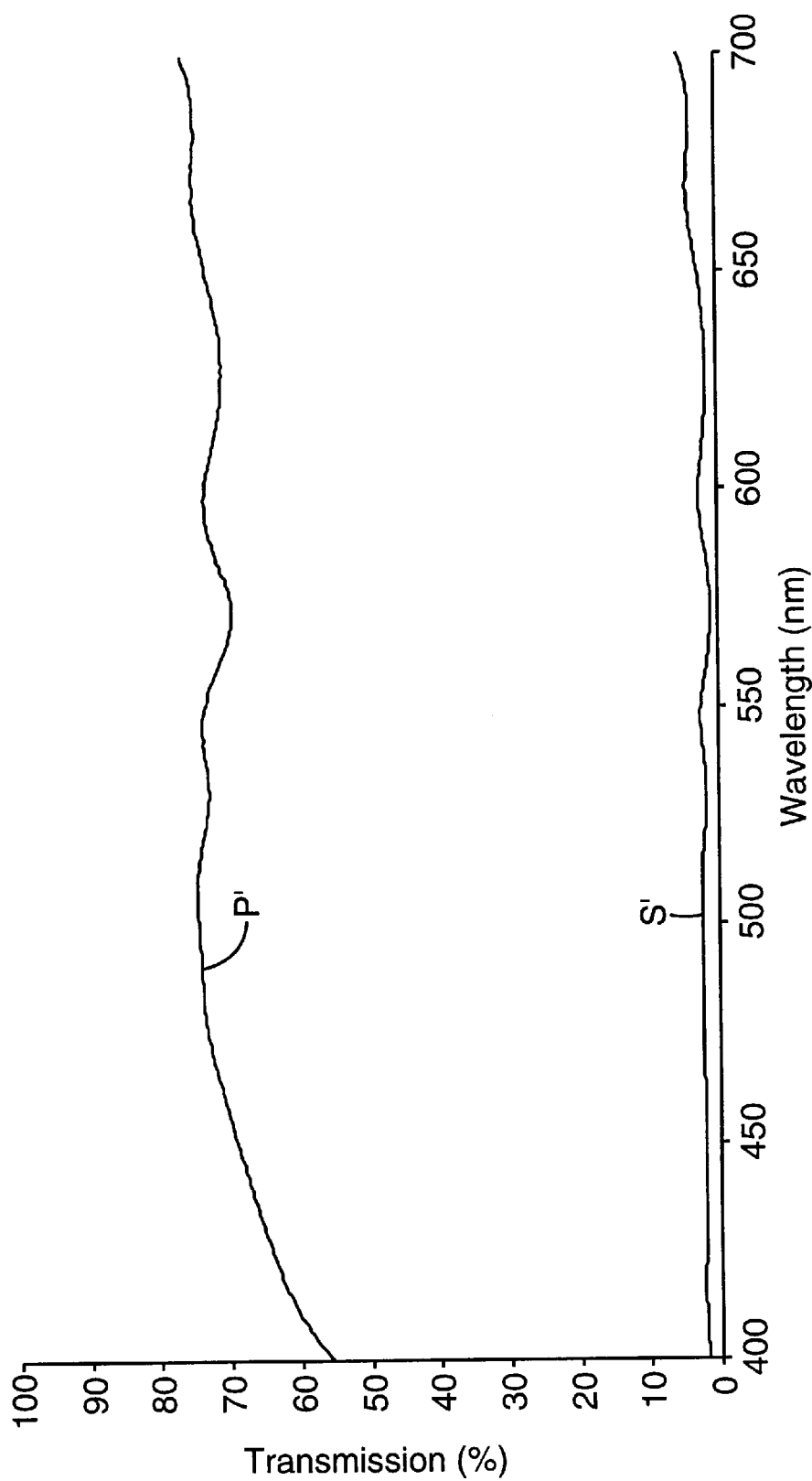
Figure 1C:
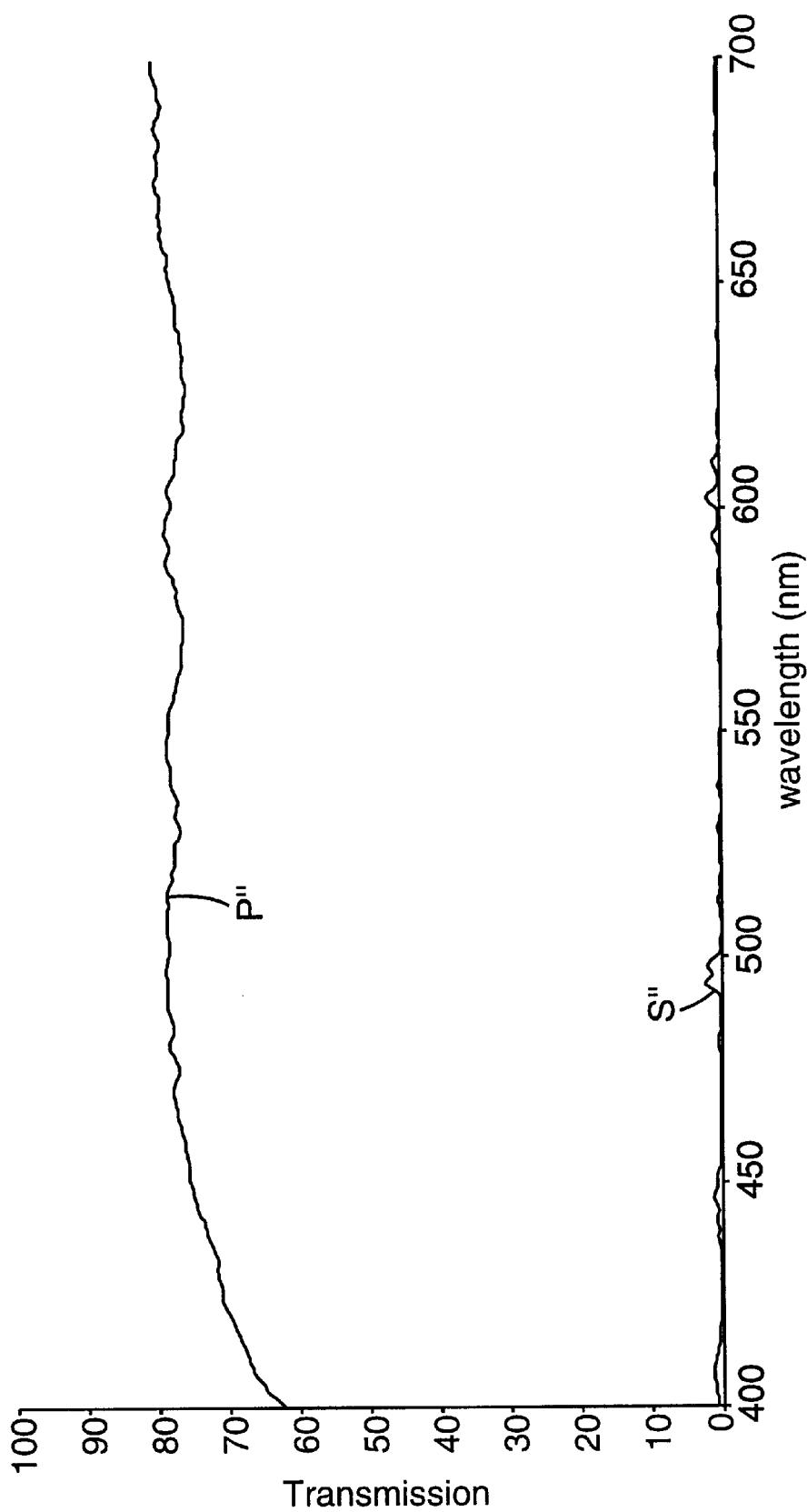
Figure 2:
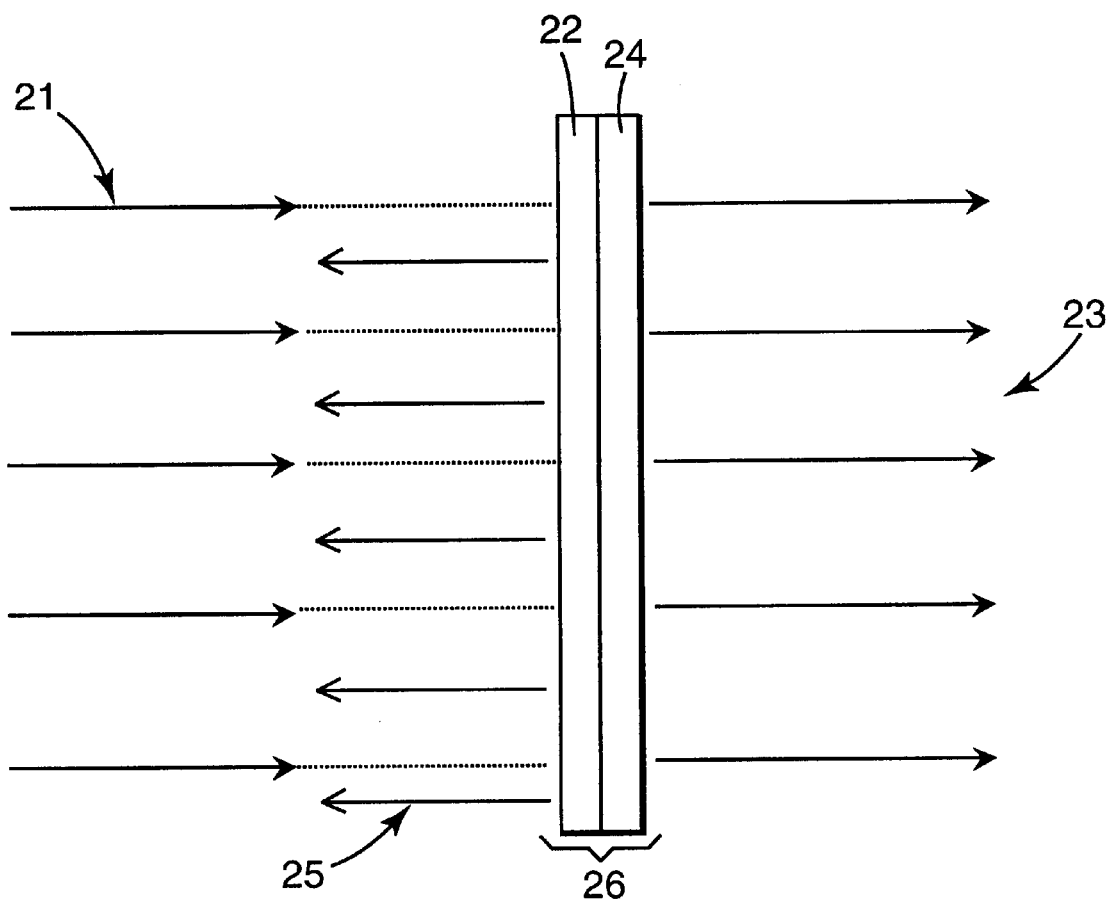
FIG. 2 illustrates an enhanced reflective polarizer in accordance with an embodiment of the invention.

Referring to FIG. 2, by laminating neutral density guest-host polarizer 24, produced in Example 6, having the transmission spectrum shown in FIG. 1b, to multilayer film reflective polarizer 22, with the transmission directions of the two polarizers aligned in a substantially parallel manner, leakage-corrected polarizer 26 is produced, which has the spectral traces P' and S' shown in FIG. 1c, wherein P' is the transmission of light linearly polarized in the transmission polarization plane of the combined reflective and guest-host polarizers, and S' is the transmission of light polarized in the reflection polarization plane of the reflecting polarizer. It will be noted, in comparing FIGS. 1A and 1B, that transmission of light, as represented by traces P and P', is only slightly reduced, from a little less than 90% for the case where only the reflecting polarizer is used, to about 80% transmission for the combined polarizers shown in FIG. 2. Referring to FIGS. 1a and 1c, however, comparing the S and S' traces shows that addition of the guest-host polarizer reduces the light leakage from about 25% transmission at around 500 nanometers to less than 2% at the same wavelengths, as indicated by trance S' in FIG. 1C. It should also be noted that because of the thin profile of the guest-host polarizers of the present invention, they show a wider extinction angle than typical polarizers using CTA layers which tend to leak light at larger viewing angles.

Figure 3:
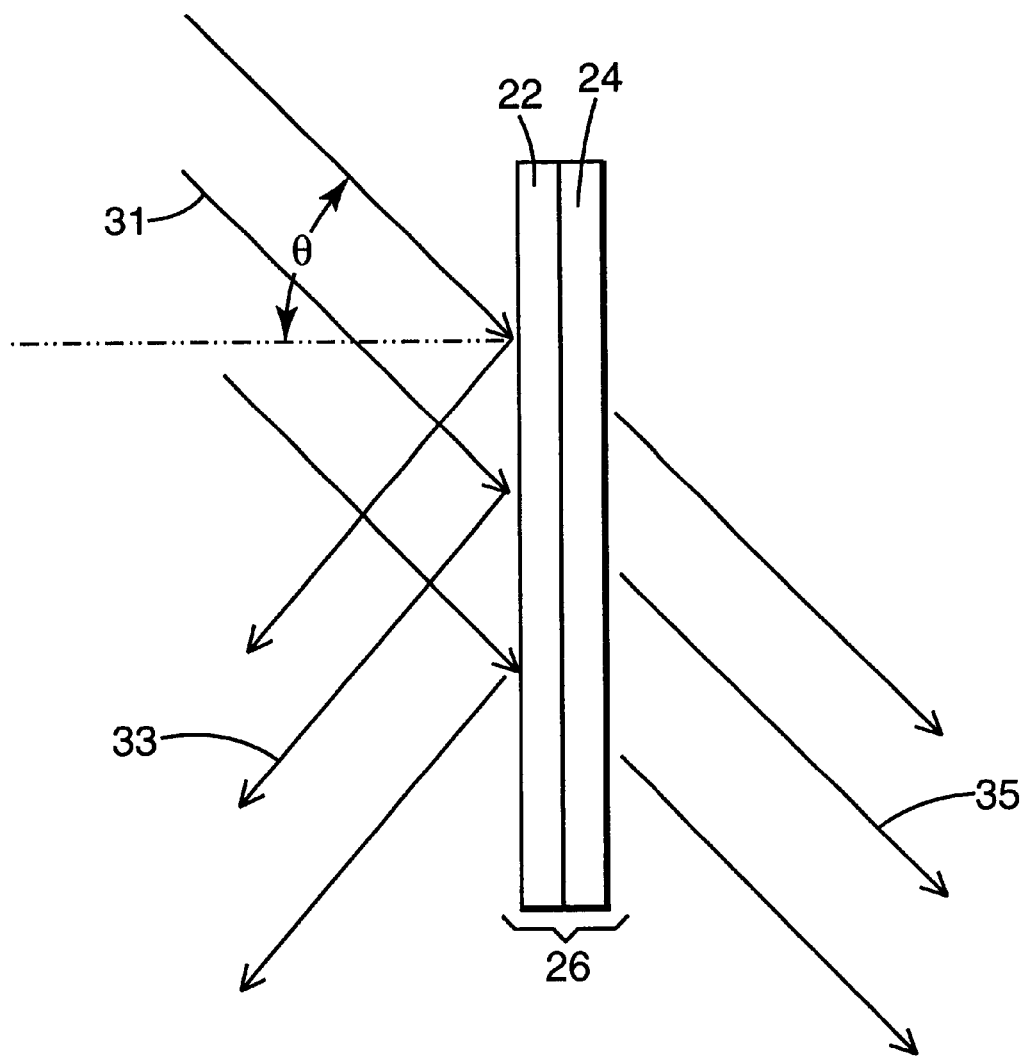
FIG. 3 illustrates an enhanced reflective polarizer in accordance with another embodiment of the invention.

Referring to FIG. 3, incident light 31 is not limited to normal incidence, but can be incident at nonzero angle θ, thereby producing a beam splitting as well as a polarizing effect, as portrayed by rays 33 and 35, which propagate in different directions and are of different polarizations. Since multilayer reflecting polarizers are susceptible to changes in performance and light leakage with changes in angle of incidence θ, it will be appreciated that the specific type of leakage correction preferred in guest host polarizer 24 may need to be adjusted to accommodate the predominant angle of incidence encountered in a particular application. It is an advantage of the present invention that because of the number of readily available dyes of various colors which can be used in the present invention, a variety of such adjustments are possible.

It will be appreciated that while the present example utilizes a guest-host polarizer which contains a combination of dyes chosen to produce a neutral density polarizer, a color correcting polarizer could contain only one dye, chosen to eliminate a light leak in only a particular limited range wavelengths, or could contain more than one dye, with the dyes chosen to produce a particular, though not necessarily neutral, correction spectrum, which, in combination with a reflecting polarizer, would produce a polarizer having some predetermined spectral characteristic.

EXAMPLE 8

Figure 4:
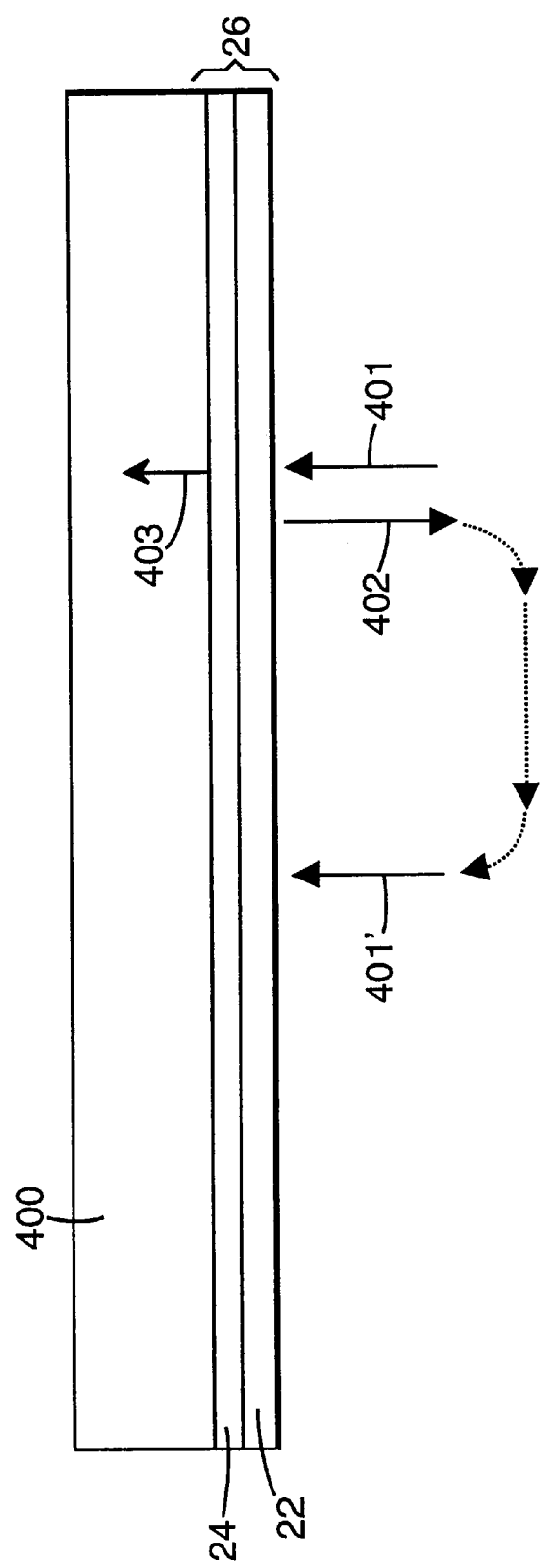
FIG. 4 illustrates a liquid crystal display in accordance with still another embodiment of the invention.

Referring to FIG. 4, a leakage corrected reflecting polarizer 26 of the type described above can be applied to a liquid crystal display 400, to form a liquid crystal display which reflects portion 402 of incident light 401 and passes, with leakage correction, polarized light portion 403. Reflected portion 402 is typically recycled by reflecting it back toward polarizer 26, using, for example, a light source enclosure, not shown, which provides some polarization conversion or randomization, thereby improving the illumination efficiency of display 400. A typical liquid crystal display is advantaged by having a recycling reflective polarizer 22 combined with a leakage correcting polarizer 24 to eliminate light leaks to form a leakage corrected reflecting polarizer 26. Such a system can significantly improve the contrast and appearance of the liquid crystal display 400. It will be appreciated that the two polarizing elements (i.e., reflective polarizer 22 and leakage correcting polarizer 24) do not need to be used in the configuration shown. A guest-host polarizer could be applied elsewhere in the system in accordance with other embodiments, including being coated directly on the liquid crystal glass substrate, on a light guide of a back light, on other brightness enhancement films (e.g., structured angularity enhancement films such BEF available from the 3M company), as a stand alone product, and the like.

While in the above example the guest-host polarizer is combined with a reflective polarizer, the guest-host polarizers of the present invention may be used in liquid crystal displays that do not use reflective polarizer in a variety of locations as described above.

EXAMPLE 9

Figure 5:
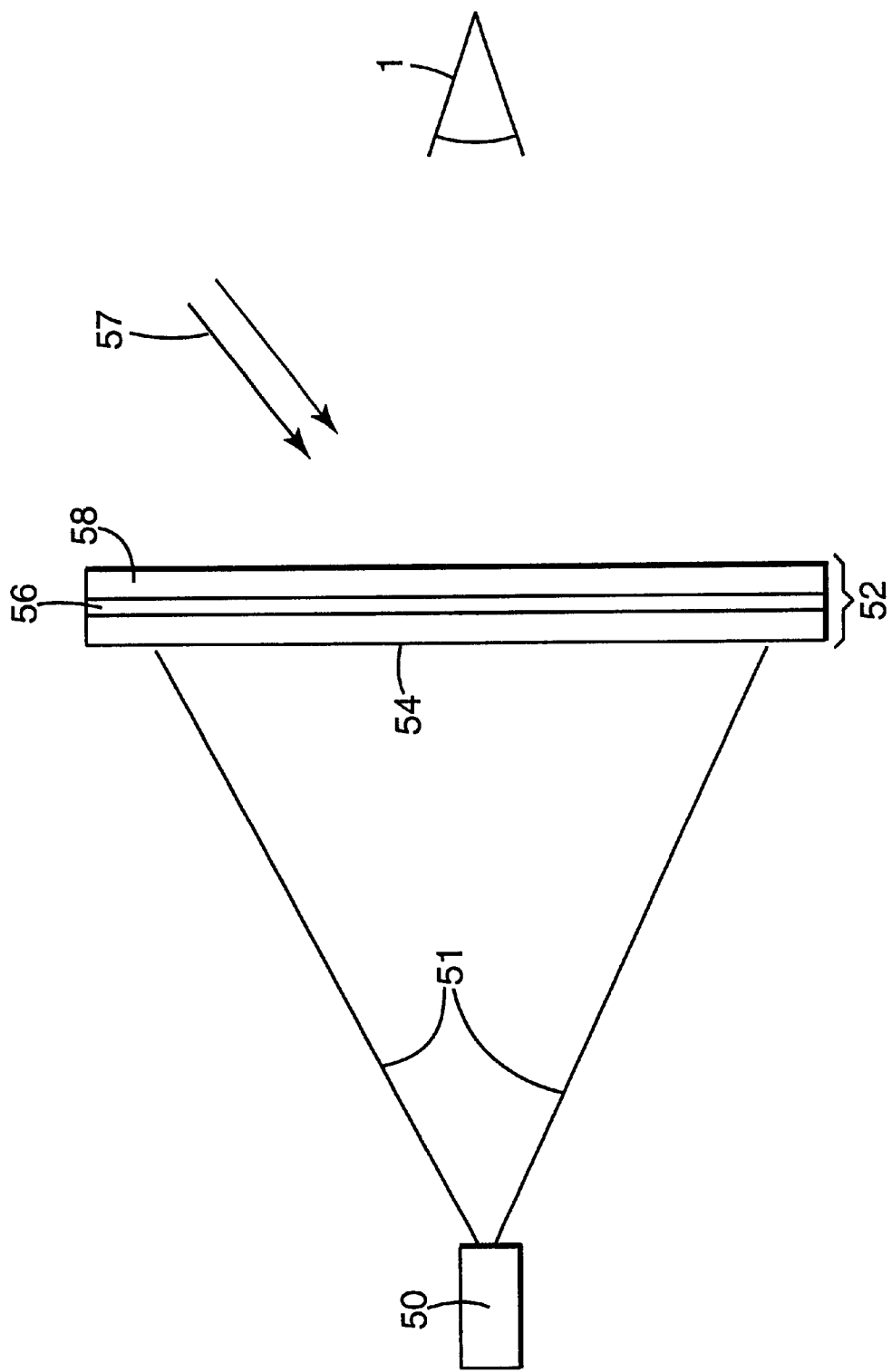
FIG. 5 illustrates a projection screen in accordance with an embodiment of the invention.

The polarizers of the present invention can be used to reduce ambient light washout of rear projection screens. Referring to FIG. 5, projection apparatus 50 projects an image onto diffusing layer 56 of rear projection screen assembly 52, for viewing by viewer 1. When ambient light 57 is at a high level, as it may be in a brightly-lit room, this light strikes diffuser 56 from the viewer side and reduces the contrast of projected image. By inserting guest-host polarizer 58 between viewer 1 and diffusing layer 56, at least one polarization component of unpolarized ambient light 57 is absorbed, thereby greatly reducing the amount of ambient light incident on diffuser 56. Moreover, some of the polarized ambient light which reaches diffusing layer 56 and is scattered back toward the viewer may have its polarization altered by the diffusing layer, so that a portion of this light is absorbed by polarizer 58, thereby further reducing the amount of ambient light reaching viewer 1 from diffusing layer 56. It will be appreciated that when projected light 51 is polarized, as it often is in liquid crystal projection systems, the transmission axis of polarizing layer 58 should be aligned to be generally parallel to the plane of polarization of projected light 51. It is an advantage of the present invention that polarizing layer 58 can be coated directly, as a thin layer, onto a variety of solid substrates, such as, in this case, diffusing layer 56. Because polarizing layer 58 is quite thin and durable, it has relatively little mechanical effect on screen assembly 52, so that it is unlikely to cause warpage or produce other detrimental mechanical effects to screen assembly 52. In other embodiments it may be desirable to coat the guest-host polarizer on a glass, polymeric or other ridged substrate with the diffuser adhered to the opposing side of the substrate.

Additional reduction in ambient light effects can be achieved by using polarized light as room illumination. For example, if ambient light 57 is polarized in the absorption direction of polarizer 58, substantially all of the ambient light incident of screen 52 will be absorbed before reaching diffusing layer 56, thereby further enhancing the viewability of images projected onto diffusing layer 56.

EXAMPLE 10

Figure 6:
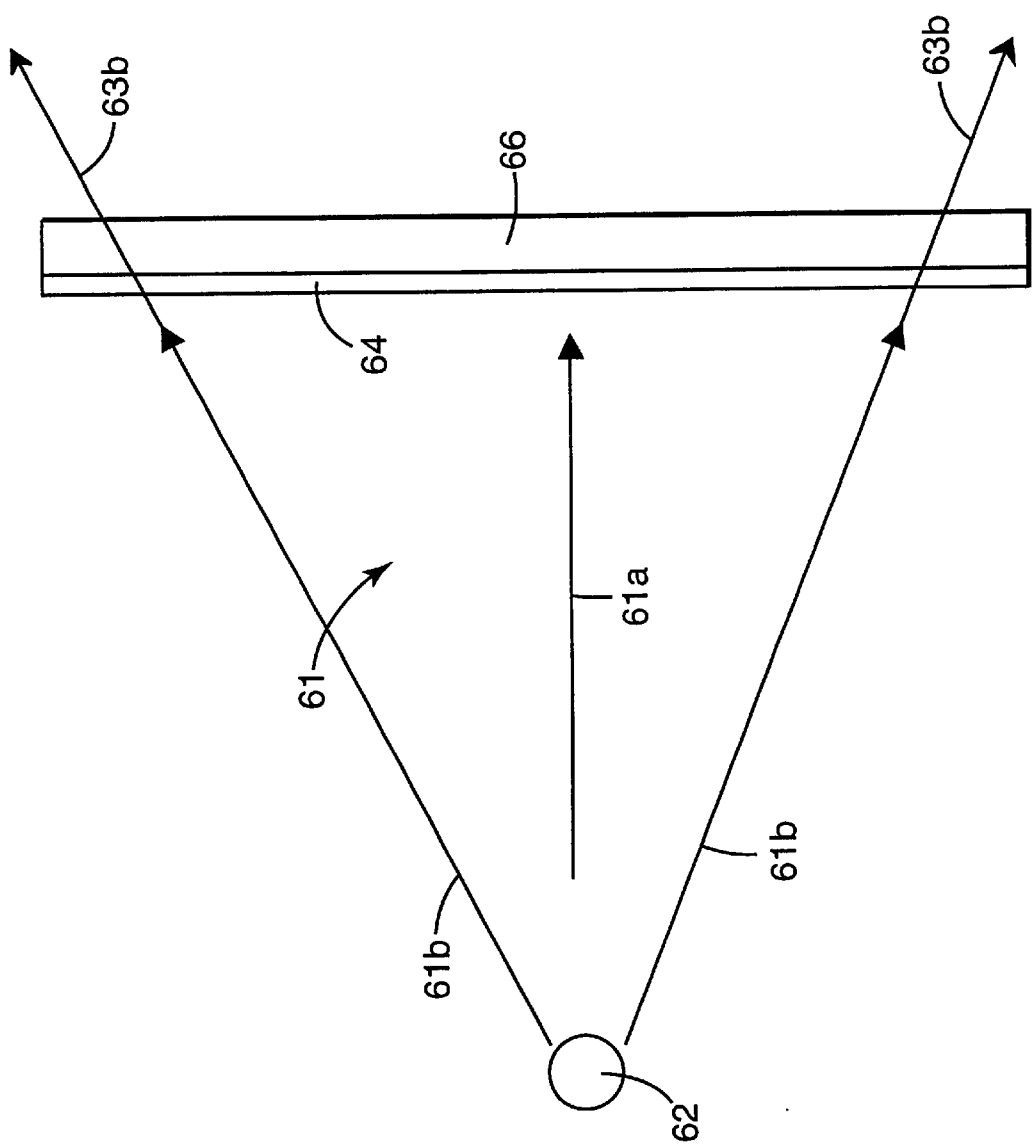
FIG. 6 illustrates a polarizer in accordance with another embodiment of the invention.

The present invention is useful for polarizing nonparallel beams of light. Polarizers are typically more effective when the light to be polarized is a collimated beam, so that all of the rays incident on the polarizer have the same angle of incidence, which is typically normal incidence. If different rays pass through a polarizer at different angles, they will have different planes of incidence and will travel different distances through the polarizer. In interference polarizers, these differences in planes of incidence may lead to significantly different planes of polarization for different rays of the same beam. In the case of absorption polarizers, the different distances of travel through the polarizing layer may lead to differing levels of polarization or to different colors of light produced by the polarizer. Referring to FIG. 6, unpolarized light rays 61 from light source 60 are incident on polarizer 64 at a variety of angles, due to the diverging nature of the light beam. It will be appreciated, from geometrical considerations, that light rays 61b, which are at the outer portions of cone of light 61, and therefore at larger angles of incidence, will encounter a longer path through polarizer 64 than will rays at lower angles of incidence, such as ray 61a. Because the guest-host polarizers of the present invention are able to accomplish a very complete polarization within a very short light transmission distance, polarizer 64 can be very thin, so that the difference in path through polarizing layer 64 between rays at different angles of incidence is quite small, so that uniformity of polarization for even relatively wide cones of diverging light is improved over some other polarizers.

EXAMPLE 11

Figure 7:
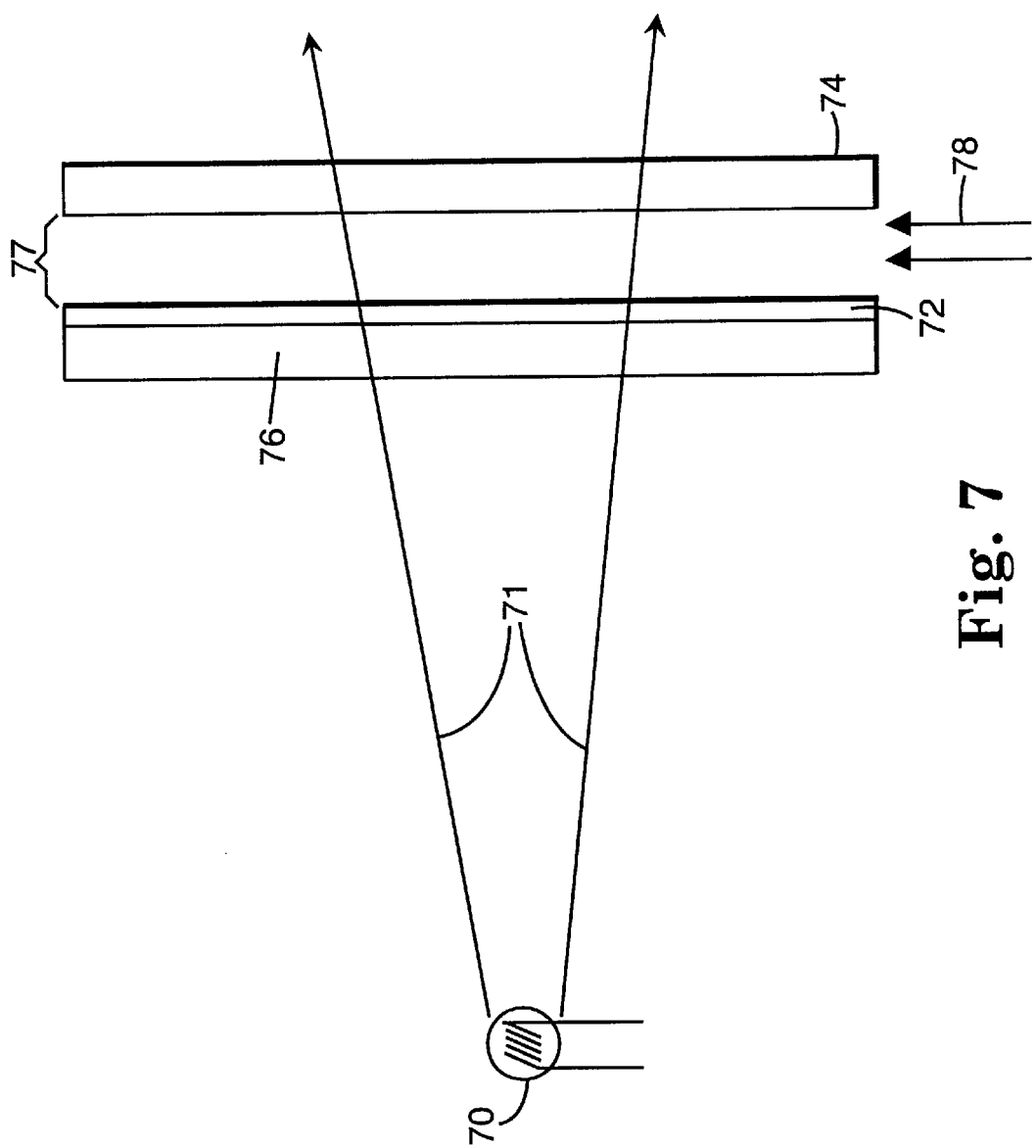
FIG. 7 illustrates another polarizer in accordance with still another embodiment of the invention.

The present invention is especially useful in applications requiring a polarizing layer capable of withstanding high temperatures. This stability is due in part to the thermal stability of the guest-host material itself, and also due in part to the ability of the guest-host material to achieve its polarization effect in a relatively short distance, so that the guest-host layer can be relatively thin and can be coated onto thermally stable substrates such as glass. More particularly, the present invention is useful as a heat filter for incandescent light sources. Referring to FIG. 7, incandescent lamp 70 produces rays 71 of electromagnetic radiation containing visible light along with a significant amount of infrared radiation. If a polarized light output is desired, guest-host polarizer 72 of the present invention can be placed in front of infrared filter 74 to reduce the infrared heating burden on this filter. In this case, guest-host polarizer 72 can contain pleochroic dyes that absorb in both the infrared range and in the visible range of the spectrum. Guest-host material 72 can be applied as a thin layer on substrate 76, which is preferably a thermally stable material such as glass. In another embodiment it may be desirable to coat the guest-host polarizer onto a highly heat-conductive material such as sapphire. Filter 74 may be an infrared absorbing material that undergoes significant heating during use. By dividing the heat load between guest-host polarizer 72, which is able to conduct much of the heat which it absorbs to substrate 76, and infrared absorber 74, cooling of these elements becomes more effective, due to the increased surface area provided by two filters rather than one. Alternatively, infrared filter 74 may be a hot mirror, that is to say a mirror that reflects in the infrared region but passes light in the visible region. Since both visible and infrared light of one polarization are absorbed by guest-host polarizer 72 before light 71 reaches hot mirror 74, the amount of infrared reflected back and eventually absorbed by some surface encountered by this reflected light will be reduced.

In a further embodiment, airflow 78 can be provided through the channel formed by polarizer 72 and infrared filter 74 to further enhance cooling.

In the above example various dyes were used. As noted above, the class of dyes suitable for use in connection with the present invention include acid, basic, direct and indirect dyes. Representative sample polarizers have been made from such dyes include:

Direct Dyes—To 10 grams of a 10 to 15% guest solutions 0.3 grams of direct blue 199 from Crompton and Knowles was added to give a polarizer in the Cyan region of the spectrum.

Reactive Dyes (Triazine based)—To 10 grams of a 10 to 15% guest solutions 0.3 grams of reactive yellow 2 from Nippon Kayaku was added to give a polarizer in the yellow region of the spectrum.

Reactive Dyes (Vinyl sulfone based)—To 10 grams of a 10 to 15% guest solutions 0.3 grams of reactive yellow 17 from Crompton and Knowles was added to give a polarizer in the yellow region of the spectrum.

Acid Dyes—To 10 grams of a 10 to 15% guest solutions 0.3 grams of acid orange 7 from Crompton and Knowles was added to give a polarizer in the yellow region of the spectrum.

Basic Dyes—To 10 grams of a 10 to 15% guest solutions 0.3 grams of basic blue 9 from Kodak was added to give a polarizer in the green-blue region of the spectrum.

Fluorescent Dyes—To 10 grams of a 10 to 15% guest solutions 0.3 grams of fluorescent yellow AA216 from Keystone corporation was added to give a polarizer in the yellow region of the spectrum While the invention has been described above with reference to particular samples, the invention is not limited to the examples. Rather, the invention is intended to cover the full scope as appreciated by those of skill in the related art and as set forth in the appended claims.

What is claimed is:

1. A polarizing device comprising a dichroic layer, said layer comprising:

(a) a molecular matrix for holding pleochroic dye molecules in a predetermined orientation, and
   (b) at least one pleochroic dye, wherein said matrix is a lyotropic nematic liquid crystalline material.

2. The device of claim 1, wherein said dichroic layer is carried on a dimensionally stable substrate.

3. The device of claim 1, wherein said molecular matrix is formed from an aqueous solution coated onto a solid substrate to form an ordered liquid layer which is subsequently solidified.

4. The device of claim 3, wherein said ordering of said liquid layer is performed by applying a shear stress to said liquid layer.

5. A dichroic polarizing layer comprising:

(a) a lyotropic nematic liquid crystalline host compound containing at least one triazine group;
   (b) a pleochroic guest dye.

6. The layer of claim 5 wherein said host compound is:

[chemical structures]

or

[chemical structure]

wherein $X^-$ is a counterion; $R^1$, which may be the same or different, is a hydrophilic group;

$R^2$, which may be the same or different, is selected from the group consisting of electron donating groups, electron withdrawing groups, and electron neutral groups;

$R^3$ is selected from the group consisting of:
   (a) unsubstituted, positively charged heteroatomic rings linked to the triazine backbone through a nitrogen atom in the $R^3$ ring, with $X^-$ as a counterion; and
   (b) substituted, positively charged heteroatomic rings linked to the triazine backbone through a nitrogen atom in the $R^3$ ring, with $X^-$ as a counterion.

7. The layer of claim 6 wherein:
   (a) $R^1$, which may be the same or different, is selected from the group consisting of COOH, $SO_3H$, $SO_2H$, $SO_2NH_2$, $PO(NH_2)_2$, and $PO(OH)_2$;
   (b) $R^2$, which may be the same or different, is selected from the group consisting of hydrogen, substituted alkyl, and unsubstituted alkyl groups.

8. The layer of claim 6, wherein $R^3$ is selected from the group consisting of substituted rings derived from pyridine, pyridazine, pyrimidine, pyrazine, imidazole, oxazole, thiazole, oxadiazole, thiadiazole, pyrazole, triazole, triazine, quinoline, and isoquinoline.

9. The layer of claim 6, wherein $R^3$ is selected from the group consisting of unsubstituted rings derived from pyridazine, pyrimidine, pyrazine, imidazole, oxazole, thiazole, oxadiazole, thiadiazole, pyrazole, triazole, triazine, quinoline, and isoquinoline.

10. The layer of claim 6, wherein $R^1$ is COOH and $R^2$ is H.

11. The layer of claim 6, wherein $X^-$ is selected from the group consisting of $SO_4H^-$, $CH_3COO^-$, $CF_3COO^-$, $BF_4^-$, $PF_6^-$, $SbF_6^-$, $CH_3SO_3^-$, $CF_3SO_3^-$, and $PhCO_2^-$.

12. The layer of claim 8, wherein $X^-$ is $Cl^-$.

13. The layer of claim 6, wherein $X^-$ is $SO_4H^-$.

14. The layer of claim 6, wherein $R^3$ is a substituted pyridine ring.

15. The layer of claim 6, wherein $R^3$ is substituted, and $X^-$ is selected from the group consisting of $SO_4OH^-$, $CH_3COO^-$, $CF_3COO^-$, $BF_4^-$, $PF_6^-$, $SbF_6^-$, $CH_3SO_3^-$, $CF_3SO_3^-$, and $PhCO_2^-$.

16. The layer of claim 6, wherein the substituents for $R^3$ are selected from the group consisting of substituted amino piperidino and pyrrolidino groups.

17. The layer of claim 8, wherein the substituents for $R^3$ are selected from the group consisting of substituted amino, piperidino, and pyrrolidino groups.

18. The layer of claim 12, wherein the substituents for $R^3$ are selected from the group consisting of 4-dimethylamino and 4-pyrrolidino groups.

19. The layer of claim 12, wherein the substituent for $R^3$ is a 4-dimethylamino group.

20. The layer of claim 5 wherein said guest dye is chosen from the group consisting of acid, basic, direct or reactive dyes.

21. An optical system comprising:

a light source; and a polarizer disposed to receive light from the light source, the polarizer including a host lyotropic nematic liquid crystal matrix having a predetermined host orientation and a guest pleochroic dye disposed within the host lyotropic liquid crystal matrix, the guest pleochroic dye being oriented by the host orientation.

22. An optical system as recited in claim 21, wherein the light source comprises a backlight light guide.

23. An optical system as recited in claim 22, wherein the polarizer is coated onto the light guide.

24. An optical system as recited in claim 22, further comprising a light modulator, the polarizer being disposed between the backlight light guide and the light modulator.

25. An optical system as recited in claim 24, where the in light modulator is a liquid crystal display.

26. An optical system as recited in claim 24, further comprising a reflective polarizer disposed between the light source and the polarizer.

27. A polarizing device as recited in claim 1, wherein the matrix comprises a clear water white material.

28. An optical system as recited in claim 21, wherein the host comprises a clear water white material.

* * * * *